J. W. YORK.
Machines for Sowing Fertilizers.

No. 146,739.  Patented Jan. 20, 1874.

2 Sheets--Sheet 1.

WITNESSES
Robert M. Fryer
A. J. Wallace

John W. York
INVENTOR

J. W. YORK.
Machines for Sowing Fertilizers.
No. 146,739.
2 Sheets--Sheet 2.
Patented Jan. 20, 1874.
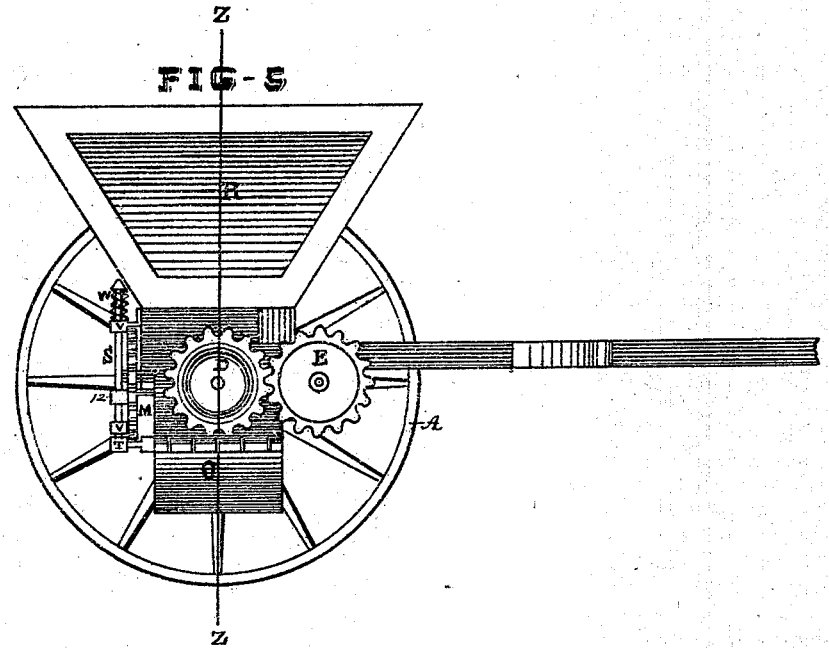
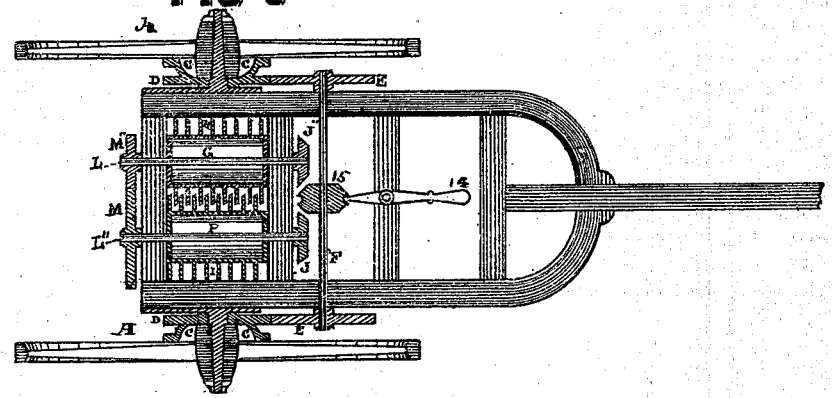
WITNESSES
Robert M. Fryer
A. I. Wallace
John W. York
INVENTOR

UNITED STATES PATENT OFFICE.

JOHN W. YORK, OF NOLENSVILLE, TENNESSEE, ASSIGNOR OF ONE-HALF HIS RIGHT TO GEORGE W. MORTON, THOMAS B. TAYLOR, AND JOSEPH H. MURRAY, OF SAME PLACE.

IMPROVEMENT IN MACHINES FOR SOWING FERTILIZERS.

Specification forming part of Letters Patent No. 146,739, dated January 20, 1874; application filed July 22, 1873.

*To all whom it may concern:*

Be it known that I, JOHN W. YORK, of Nolensville, county of Williamson and State of Tennessee, have invented certain new and useful Improvements in Implements for Sowing Fertilizers, of which the following is a specification:

This invention relates to a somewhat similar invention for which Letters Patent of the United States, No. 137,586, were granted to me on the 8th day of April, 1873. The object of both of these inventions is to pulverize and sow manure in drills or spots, avoiding the great waste consequent by scattering it broadcast when it is only required for the nourishment of the contents of drills or hills. Now, by referring to the said patent, it will be observed that the grinding portion of the apparatus consists of a revolving toothed cylinder and a toothed segment, arranged to regulate the supply and quality (fine or coarse) of manure delivered to the ground; whereas, in the description of the improved implement, it will be seen that two revolving toothed cylinders are employed, one of which rotates faster than the others. It will also be noticed that the dropping arrangement is radically different from that shown in said patent, as well as the driving-gear, all except the running-gear, upon which the implement is mounted, this being substantially the same.

I will now give a general description of my invention, with reference to the accompanying drawings, in which—

Figure 1:
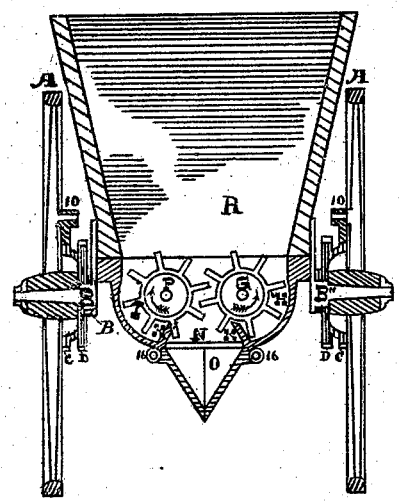
Figure 2:
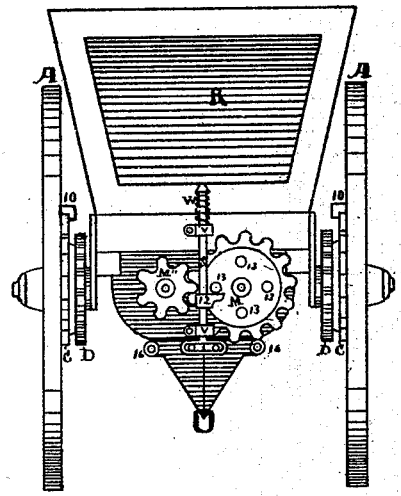
Figure 3:
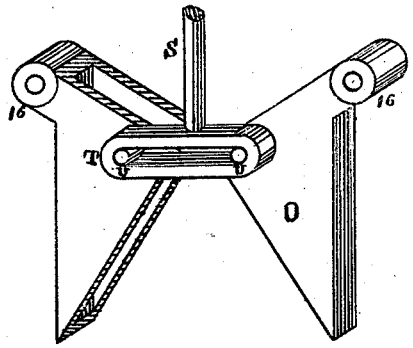
Figure 4:
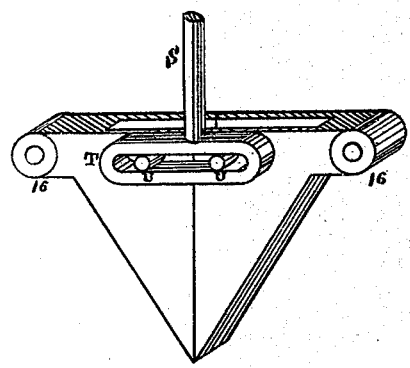

Figure 1 represents a vertical transverse section through the line Z Z of Fig. 5; Fig. 2, a rear elevation. Figs. 3 and 4 represent the droppers open and shut. Fig. 5 represents a side elevation, the nearest wheel being removed to show more plainly the gear-wheels D and E. Fig. 6 is a sectional plan of the driving-gear and grinding portion of the apparatus.

A A″ are the wheels, upon which the implement is supported by means of studs B, which are provided with flanges fastened to the sides of the frame of the implement. C is a ratchet-wheel, with which each of the studs B are provided, and with the said ratchets the pawls 10 10 connect, similar to the ratchet described in the said patent, No. 137,586; but with the said ratchets gear-wheels D are combined and connect with suitable gear-wheels E on a shaft, F, upon which slides a double-faced miter-gear, 15, which may be made to engage alternately with two miter-gears, J J″, attached to shafts L L″, as shown in Fig. 6, the opposite ends of which are provided with gear-wheels M M″, one of which is larger than the other, for the purpose of running one of the said shafts faster than the other. Upon shaft L is cylinder G, provided with knives or teeth H, corresponding with similar teeth, I, situated in a similar cylinder, P, upon shaft L″. The cylinders are inclosed at the sides and ends in box N, from whence teeth K extend up between the revolving teeth of both cylinders, and by this means they are kept clean, and the fertilizer that once finds its way below the center of the cylinders, which always revolve in the direction of the arrows, cannot be again carried to the top of the cylinders, which are kept exposed to the contents of the hopper R, which connects with the box N, which also connects with dropper O. This box, as it may be called, resembles an inverted pyramid, provided at the upper outward edges with hinges 16. It is made to part through its center vertically, as shown in Fig. 3 of drawing, by a downward thrust of the rod S, connected with yoke T, in connection with the pins U U. By referring to Fig. 2, it will be observed that the said rod S is suitably guided by means of guider V V, to preserve its rectilinear motion, and to provide a base for the spring W, which throws to the upper end of its stroke said rod S, after being driven down by the toe 12 in connection therewith, which is operated by means of pins 13, located on the side of the gear-wheel M, as shown. As many of these pins may be arranged upon the wheel as are needed, and the dropping operations performed as often as practically desired. 14 is a lever pivoted to the main frame, as shown in Fig. 6, provided at one end with a handle and at the other end with a knuckle, which enters a groove formed between the two faces of the double miter-wheel 15, which freely reciprocates upon the shaft F, but is revolved therewith by means of a feather or other suitable contrivance. It will be noticed that sufficient space is left between the gear-wheels J J'' to permit the said gear-wheel 15, when standing midway between the two, to revolve without coming in contact with either. Therefore, it will be readily seen that by the use of the lever 14 the whole grinding portion of the implement may be stopped or started at pleasure, when the implement is moving forward, or the speed of the cylinder may be increased or diminished; for, when the miter-gear J is in connection with gear 15, the cylinders G and P rotate just twice as fast as when it engages with J''—that is, when the relative size of the gearing shown is employed throughout the entire implement. This, however, may be varied at pleasure to meet the practical requirements of the case.

Operation: Supposing the hopper R to be filled with the desired fertilizer, the pawls 10 upon the driving-wheel A A are thrown into gear with the ratchet-wheel C, which is made to revolve according to the forward progress of the implement. The shaft F is now caused to revolve by the gearing connections heretofore described, by means of which rotary motion is imparted to the cylinders G and P, (in the direction of the arrows,) one of which moves faster than the other, both acting together in drawing the fertilizer from the hopper; but owing to the excessive speed of one, the teeth in connection therewith, while meshing between the teeth of the other, practically pulverize the said fertilizer, delivering it to the dropper O, from whence it is delivered either in spots or in a continual drill. This latter operation is performed by slacking the toe 12, so as not to come in contact with pins 13, when the rod S may be placed to open the bottom of the dropper sufficiently to make a fine, or, comparatively, a scattered drill.

What I claim as my invention, and desire to secure by Letters Patent of the United States, is—

1. In an implement for sowing fertilizers, the combination of the inverted pyramidal dropper O, hinges 16, pins U U, slotted yoke T, and rod S, as and for the purpose set forth.

2. In combination with the V-shaped hinged dropper, the guide-pins, yoke, and rod S, the toe 12, pins 13, and spring W, substantially as and for the purpose described.

3. The combination of toothed cylinders G and P, unequal gear-wheels M M'', miter-wheels J J'', double-faced miter-wheel 15, and pivoted lever 14, substantially as and for the purpose described.

JOHN W. YORK.

Witnesses:
ROBERT M. FRYER,
A. I. WALLACE.